Patented May 28, 1929.

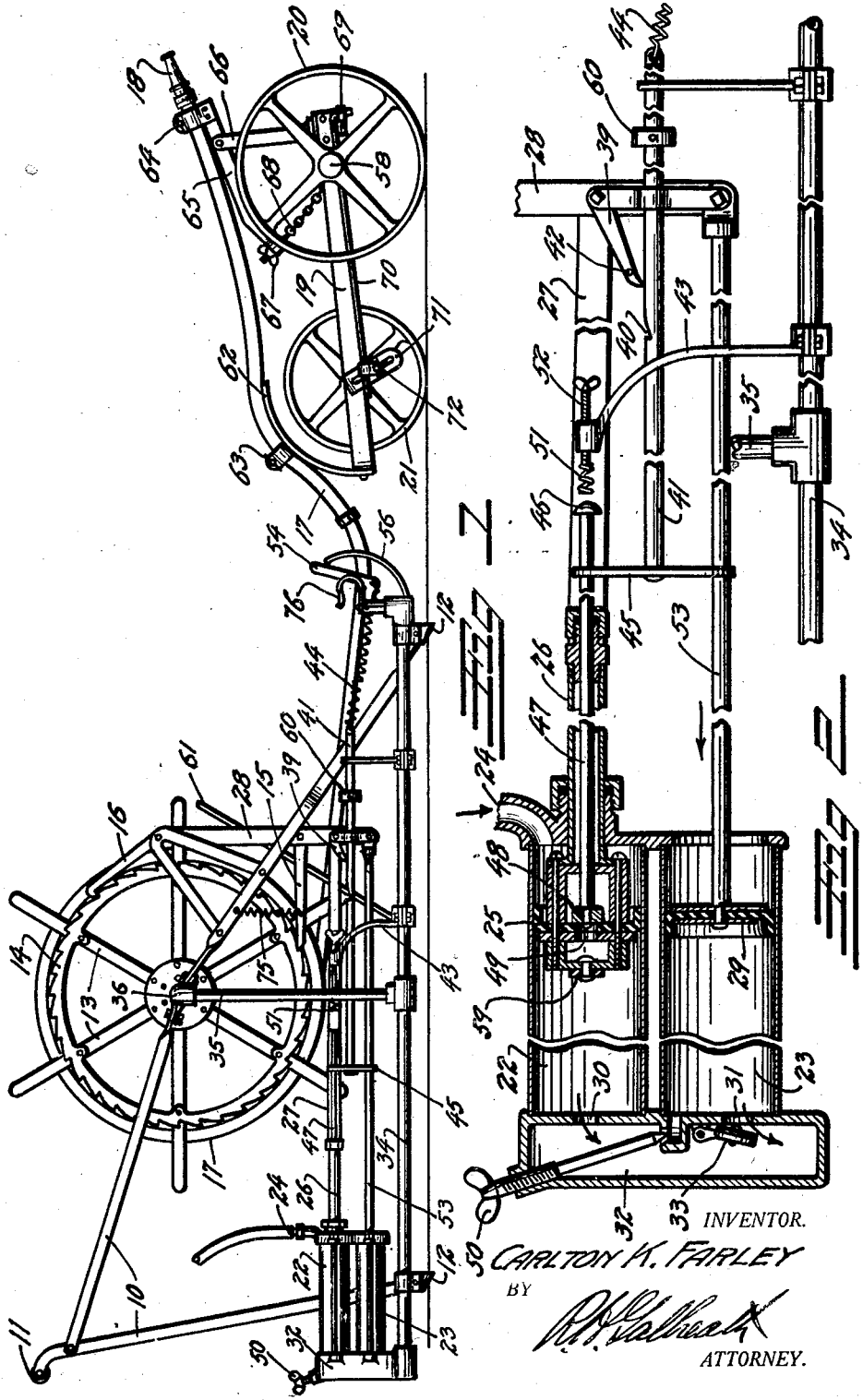

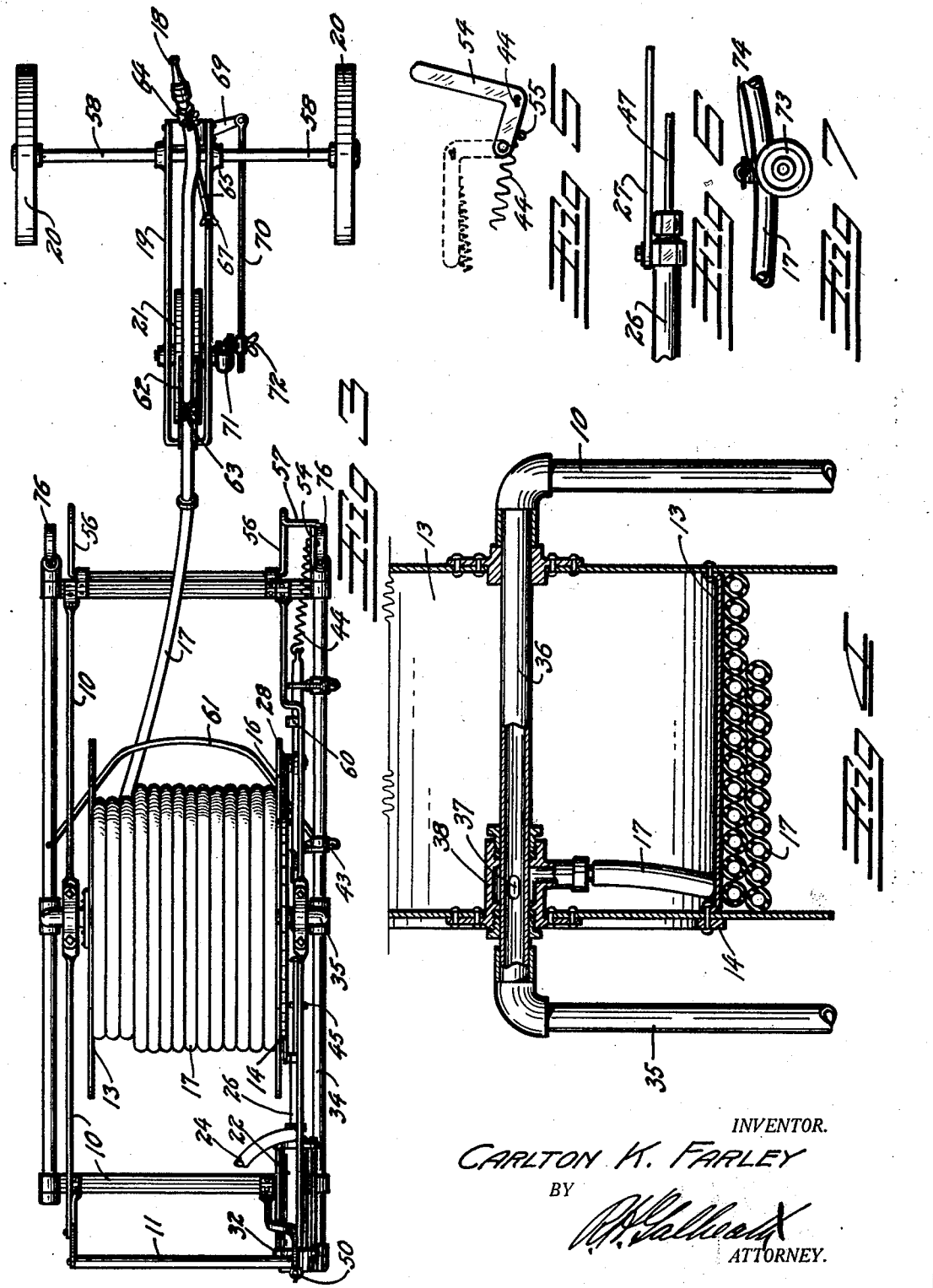

1,714,713

UNITED STATES PATENT OFFICE.

CARLTON K. FARLEY, OF GREELEY, COLORADO.

LAWN-SPRINKLING DEVICE.

Application filed March 11, 1926. Serial No. 93,873.

This invention relates to a device for automatically sprinkling a lawn, and has for its principal object the provision of a device of this character which, when placed upon the lawn, will automatically water a swath of any desired length and breadth.

Another object of the invention is to provide means whereby the water supply to the sprinkler will be automatically shut off when the desired section of a lawn has been covered.

A further object is to provide a device which will be operated entirely by the flow of water to the nozzle and in which this flow will be uninterrupted until the sprinkling has become completed.

A further object is to have the hose always reeled.

A still further object it to so construct the device that the entire operating mechanism will be stationary so as to lessen the weight upon the traveling portion of the sprinkler.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation of the complete invention.

Fig. 2 is a detail longitudinal section through the mechanism employed for operating the device.

Fig. 3 is a plan view of the complete sprinkling device.

Fig. 4 is a detail section through the hose reel.

Fig. 5 is a detail view illustrating the action of the automatic "shut-off" lever.

Fig. 6 is a detail view illustrating the connection between the rearward piston rod and its connecting rod.

Fig. 7 is a castor wheel hose clamp which may be employed with the device.

The invention comprises, broadly, a stationary frame carrying a hose reel and mechanism for rotating the reel. The nozzle extremity of the hose is carried on a traveling sprinkler cart which is drawn toward the stationary frame by the rotation of the hose reel.

The stationary frame is indicated at 10 and is provided with a handle 11 for convenience in moving it about. The frame 10 carries teeth 12, which engage in the lawn and prevent movement of the frame. The hose reel, indicated at 13, carries at one side a ratchet wheel 14, which is rotated through the medium of a dog 15, held in contact with the ratchet wheel by a spring 75, and prevented from rearward rotation by a second locking dog 16, maintained in contact with the ratchet wheel by gravity. The hose is illustrated at 17, terminating in a nozzle 18, supported from a cart frame 19 supported on front and rear wheels 20 and 21, respectively. The dog 15 is operated by water pressure in a pair of cylinders, the power cylinder 22 and the return cylinder 23. Water is admitted to the upper or power cylinder 22 through a water pressure connection 24, from the supply hydrant.

In operation, water flows into the power cylinder 22 from the connection 24 and forces a power piston 25 rearwardly therein. The piston 25 is connected through the medium of a hollow piston rod 26 and connecting rod 27 to a rocker arm 28 which carries the ratchet dog 15. As this piston moves rearwardly, the rocker arm is also swung rearwardly and the reel rotated in a clock-wise direction. The movement of the rocker arm 28 is also communicated to a second or return piston 29 which is moved rearwardly in the cylinder 23 through the medium of a piston rod 53.

The contained water in the cylinders 22 and 23 will be forced ahead of the pistons through ports 30 and 31, respectively, into a hollow cylinder head 32. In flowing through the port 31, the water will open a check valve 33. From the cylinder head 32, the water flows into a horizontal pipe 34, forming the base of the frame 10, and from thence into a vertical pipe 35 to the reel axle 36. The axle 36 of the reel is provided with a discharge opening 37 communicating with a housing 38, which forms one of the hubs of the reel. One extremity of the hose 17 is connected with the housing 38 and obtains its water therefrom.

A stroke control ratchet 39 is also carried by the rocker arm 28 and, as the arm moves rearwardly, this ratchet will engage a notch 40 in a stroke control rod 41 and draw this rod rearwardly with the rest of the mechanism. When the pistons approach the rearward extremity of the cylinders 22 and 23, a pin 42, on the stroke control ratchet 39, will contact with a curved bracket arm 43 so as to lift the ratchet from the notch 40. This releases the stroke control rod 41 and allows a spring 44 to snap it forwardly. The stroke control rod 41 carries a head 45 which, when the rod is snapped forward, will engage a head 46 on the extremity of a valve rod 47, which passes entirely through the hollow piston rod 26 and terminates in a valve 48. This draws the valve 48 away from a central opening 49 in the piston 25 and allows the water to flow through this opening without exerting pressure against the piston 25. This water flows through the port 30 into the cylinder head 32 and thence to the hose. The flow of the water from the hose is restricted by the nozzle 18 so that a pressure is built up in the cylinder head 32. This pressure acts to close the check valve 33 to prevent water from entering the cylinder 23 through the port 31. A portion of the water, however, will be forced through a small opening controlled by a needle valve 50 and exert a forward pressure upon the piston 29, causing it to travel forwardly in the cylinder 23. This reverses the direction of swing of the rocker arm 28 and draws the piston 25 also forwardly in its cylinder.

This motion continues until the head 46 of the valve rod 47 contacts with a resilient stop 51 carried on the upper extremity of the bracket 43. The length of the return stroke is governed by the position of this stop 51 which is adjusted by means of an adjusting screw 52. When this contact has taken place, the valve 48 will close the opening 49 in the piston 25 and allow the water pressure to again force this piston rearwardly in the cylinder. The speed of the return stroke can be minutely adjusted by means of the needle valve 50.

At this time, the nozzle is cut off from the water supply 24, but the rearwardly moving pistons will force water from the cylinders 22 and 23 to the nozzle so that the flow at the nozzle is uninterrupted.

At each forward movement of the rocker arm, 28, the dog 15 will engage a new tooth on the ratchet wheel 14 and at each rearward movement thereof, the dog will turn the reel in a clock-wise direction. The dog 16 rides over the teeth of the ratchet and prevents rearward rotation thereof.

Automatic shut off of the water, when the sprinkler has reached the limit of its travel, is accomplished as follows: The forward extremity of the spring 44 is connected at the angle of an L-shaped lever 54. This lever is pivoted to the frame 10 at one of its extremities, the other extremity normally projecting upwardly. In the operating position, the spring 44 tends to draw the lever 54 downwardly from its dead center position against a stop 55, as illustrated in Fig. 5. A spring bumper bar 56 is secured to the front of the frame 10 and has an arm 57 which contacts with the lever 54. The front axle 58 of the sprinkler cart will strike this bumper bar and cause it to throw the lever 54 past the dead center position, allowing the spring 44 to snap the lever rearwardly to the broken line position of Fig. 5. This releases the tension on the spring 44 and removes its tendency to draw the stroke control rod 41 forwardly, so that the piston valve 48 will remain closed, allowing the piston 25 to travel to the extreme end of the cylinder 22, at which point, a valve 59 carried by the piston 25, will close the port 30, thus preventing any further flow of water to the nozzle and to the cylinder 23, and effectively stopping the operation of the device. The front cross bar of the frame 10 and the lateral portion of the bumper bar 56 both lie sufficiently close to the lawn surface to allow the rear wheel 21 to pass over them so that the axle 58 may be brought into contact with the bumper bar.

A set collar 60 is carried by the stroke control rod 41 to limit its forward motion. A hose guide 61 is carried by the frame 10 to guide the hose 17 upon its reel 13.

The sprinkler cart frame 19 carries a curved hose guard 62 which carries the hose over the rear wheel 21 and which is provided with a hose clamp 63 for clamping the sprinkler cart to the hose. The forward extremity of the hose is clamped by a nozzle guide clamp 64 which is carried on the forward extremity of a nozzle guide 65 pivoted to a rotatable nozzle guide post 66. The angle of inclination of the nozzle 18 is controlled by a nut 67 which adjusts the length of a chain connection 68 to the rear extremity of the nozzle guide 65. Screwing the nut 67 downward raises the nozzle, and loosening the nut lowers the nozzle.

The nozzle guide post 66 is rotated by means of a lever 69, a connecting rod 70 and an adjustable radius crank 71, so that the rotation of the rear wheel 21 will cause the nozzle to oscillate from side to side as the cart travels. The arc of oscillation is adjusted by moving a clamp screw 72 in a longitudinal slot in the adjustable crank 71. Should no oscillation be desired, the clamp screw 72 is placed in the inner extremity of the slot in alignment with the axis of the rear wheel 21, where no movement of the connecting rod 70 would result from rotation of the wheel.

Since the chain connection 68 is of a fixed length, it will draw the rear extremity of the nozzle guide downward as it approaches the limits of its arcuate swing. This causes the nozzle to simultaneously swing in a vertical arc as well as in a horizontal one and sprinkle a straight strip at right angles to the direction of travel of the cart. As the crank 71 passes its dead center point, the nozzle will pause in its swing, thus giving the sides of the swath a volume of water which compensates for the double passage of the water at other points of the swing, thus resulting in a uniform application throughout the full width of the swath.

To relieve friction between the ground and the hose, where the device is employed for unusually long swaths, I employ caster wheels 73 which are secured to the hose at convenient intervals by means of clamps 74. These wheels elevate the hose above the ground and reduce friction and wear between it and the lawn.

When not in use, or when moving the device, the sprinkler cart is placed upon the forward extremity of the frame 10. The front wheel axle 58 of the cart engages in U-shaped clips 76 carried at the forward extremity of the frame 10.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A lawn sprinkling device comprising, a reel; reel carrying mechanism; a hose carried on said reel, a carriage secured to and supporting the nozzle extremity of said hose; and water operated means for rotating said reel, said water operated means acting automatically and simultaneously with the flow of water through said hose so as to draw said carriage toward said reel.

2. A lawn sprinkling device comprising, a reel; reel carrying mechanism; a hose carried on said reel; a carriage secured to and supporting the nozzle extremity of said hose; and water operated means for rotating said reel so as to draw said carriage toward said reel, the discharge from said water operated means being expelled through said nozzle extremity.

3. A lawn sprinkling device comprising, a reel; reel carrying mechanism; a hose carried on said reel; a carriage secured to and supporting the nozzle extremity of said hose; water operated means for rotating said reel so as to draw said carriage toward said reel, said water operated means comprising cylinders; and pistons in said cylinders arranged to operate a ratchet mechanism on said reel.

4. A lawn sprinkling device comprising, a reel; reel carrying mechanism; a hose carried on said mechanism; a carriage secured to and supporting the nozzle extremity of said hose; water operated means for rotating said reel so as to draw said carriage toward said reel; and means for shutting off the water supply when said carriage has approached said reel.

5. A lawn sprinkling device comprising a portable support; a reel mounted on said support; water operated means arranged to rotate said reel; a wheeled cart; a hose adapted to be carried on said reel, the nozzle extremity of said hose being secured to and carried on said cart; and a control mechanism on said support adapted to contact with said cart to stop said water operated means.

6. Means for rotating a hose reel, comprising a ratchet wheel carried by said hose reel; a ratchet dog arranged to engage the teeth of said ratchet wheel; a first cylinder; a first piston arranged to be operated by water pressure in said cylinder and operatively connected so as to move said dog in one direction; a second cylinder; a second piston arranged to be operated by water pressure in said second cylinder and operatively connected so as to move said dog in the other direction, said first piston having an opening to allow water to pass therethrough; and means for maintaining said opening closed as said pistons move in one direction.

7. Means for rotating a hose reel comprising a ratchet wheel carried by said hose reel; a ratchet dog arranged to engage the teeth of said ratchet wheel; a first cylinder; a first piston arranged to be operated by water pressure in said cylinder and operatively connected so as to move said dog in one direction; a second cylinder; a second piston arranged to be operated by water pressure in said second cylinder and operatively connected so as to move said dog in the other direction, said first piston having an opening to allow water to pass therethrough; means for maintaining said opening closed as said piston moves in one direction, said means comprising a valve; an operating rod on said valve extending to the exterior of said first cylinder; and means for imparting longitudinal movement to said operating rod.

8. Means for rotating a hose reel comprising a ratchet wheel carried by said hose reel; a ratchet dog arranged to engage the teeth of said ratchet wheel; a first cylinder; a first piston arranged to be operated by water pressure in said cylinder and operatively connected so as to move said dog in one direction; a second cylinder; a second piston arranged to be operated by water pressure in said second cylinder and operatively connected so as to move said dog in the other direction, said first piston having an opening to allow water to pass therethrough; and means for maintaining said opening closed as said piston moves in one direction, said first piston carrying a valve arranged to prevent discharge of water from said first cylinder when said piston is at one extremity of its stroke.

9. Means for rotating a hose reel comprising a ratchet wheel carried by said hose, a ratchet dog arranged to engage the teeth of said ratchet wheel; a first cylinder; a first piston arranged to be operated by water pressure in said cylinder and operatively connected so as to move said dog in one direction; a second cylinder; a second piston arranged to be operated by water pressure in said second cylinder and operatively connected so as to move said dog in the other direction, said first piston having an opening to allow water to pass therethrough; means for maintaining said opening closed as said piston moves in one direction, said means comprising a valve; an operating rod on said valve extending to the exterior of said first cylinder; means for imparting longitudinal movement to said operating rod, said means comprising a stroke control rod arranged to be moved in one direction by a spring and in the other direction by the movement of said first piston; and means for releasing said stroke control rod at one limit of its travel so as to allow said spring to move it to the other limit of its travel.

10. A reel carriage and a reel mounted therein for winding a hose thereon; means for connecting the inner end of the hose to a source of water supply adapted to permit the rotation of the connected end of the hose with the drum without disturbance of the connection; a water distributer; a carriage on which it is mounted adapted to travel over the area to be served, the other end of the hose being connected to the distributer; means for rotating the reel to wind the hose thereon and draw the distributer carriage toward the reel carriage, and means for automatically shutting off the water supply by the arrival of the distributer carriage at the reel carriage.

In testimony whereof, I affix my signature.

CARLTON K. FARLEY.